United States Patent [19]
George et al.

[11] 3,951,738
[45] Apr. 20, 1976

[54] NUCLEAR REACTOR COOLANT AND COVER GAS SYSTEM

[75] Inventors: John A. George, Greensburg; Arnold H. Redding, Export; Stephen N. Tower, Murrysville, all of Pa.

[73] Assignee: Westinghouse Electric Corporation, Pittsburgh, Pa.

[22] Filed: May 10, 1974

[21] Appl. No.: 468,778

[52] U.S. Cl. .................. 176/65; 176/51; 176/62; 176/87
[51] Int. Cl.² ........................... E21C 7/06
[58] Field of Search .............. 176/40, 51, 52, 62, 176/63, 65, 87

[56] References Cited
UNITED STATES PATENTS

| | | | |
|---|---|---|---|
| 3,548,931 | 12/1970 | Germer et al. | 176/87 X |
| 3,793,143 | 2/1974 | Muller | 176/65 |
| 3,859,166 | 1/1975 | Flynn et al. | 176/65 X |

FOREIGN PATENTS OR APPLICATIONS

| | | | |
|---|---|---|---|
| 613,363 | 1/1961 | Canada | 176/65 |
| 1,137,865 | 12/1968 | United Kingdom | 176/65 |
| 1,815,046 | 6/1970 | Germany | 176/65 |

OTHER PUBLICATIONS

Liquid Metal Fast Breeder Reactor Study Design, West. Elec. Corp., Atomic Power Div., P.O. Box 355, Pitts., Pa., 1964, p. 311.

*Primary Examiner*—Stephen C. Bentley
*Assistant Examiner*—P. A. Nelson
*Attorney, Agent, or Firm*—Z. L. Dermer

[57] ABSTRACT

A core cooling system is disclosed for a nuclear reactor of the type utilizing a liquid coolant with a cover gas above free surfaces of the coolant. The disclosed system provides for a large inventory of reactor coolant and a balanced low pressure cover gas arrangement. A flow restricting device disposed within a reactor vessel achieves a pressure of the cover gas in the reactor vessel lower than the pressure of the reactor coolant in the vessel. The low gas pressure is maintained over all free surfaces of the coolant in the cooling system including a coolant reservoir tank. Reactor coolant stored in the reservoir tank allows for the large reactor coolant inventory provided by this invention.

19 Claims, 6 Drawing Figures

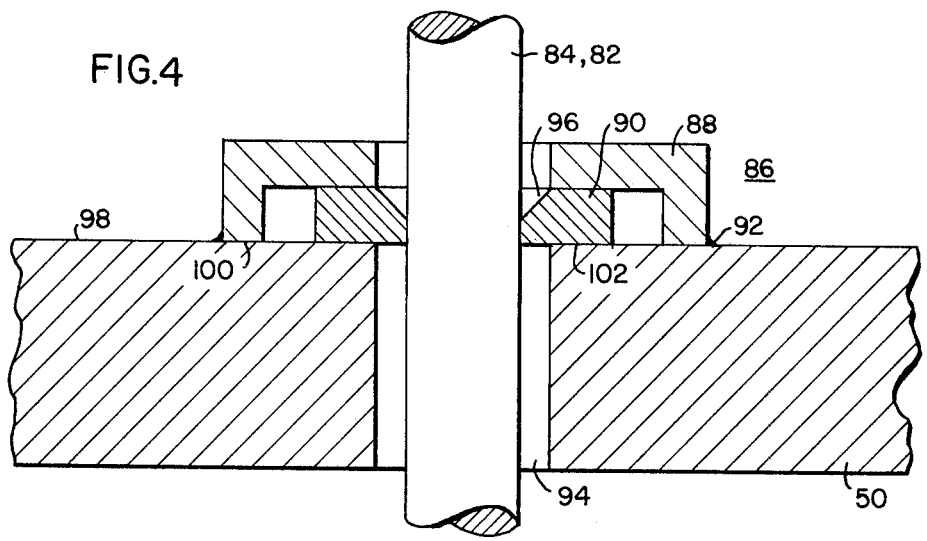
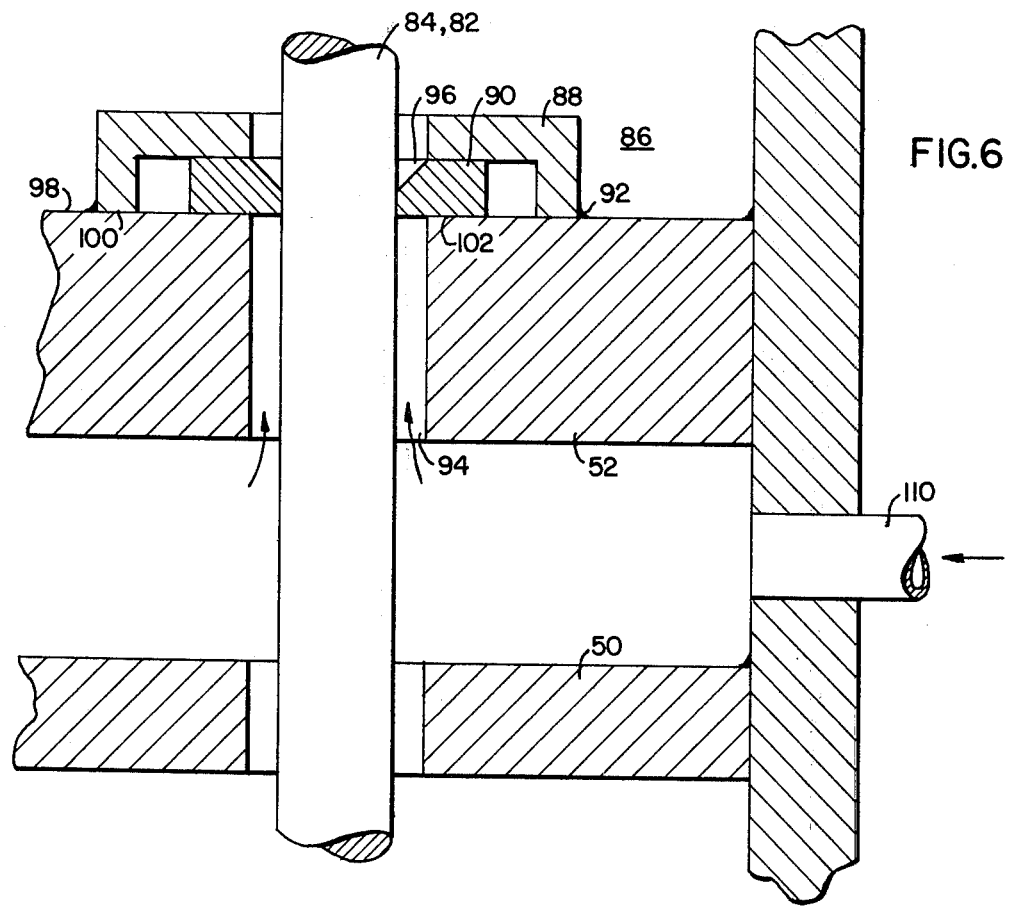

NUCLEAR REACTOR COOLANT AND COVER GAS SYSTEM

BACKGROUND OF THE INVENTION

1. Field of the Invention:

This invention relates generally to nuclear reactors and more particularly to a core cooling system for a liquid cooled nuclear reactor having a cover gas above free surfaces of the reactor coolant.

2. Description of the Prior Art:

A nuclear reactor produces heat by fissioning of nuclear materials which are fabricated into fuel elements and assembled within a nuclear core. In commercial nuclear reactors, the heat produced thereby is used to generate electricity. Such nuclear reactors usually comprise one or more primary flow and heat transfer systems and a corresponding number of secondary flow and heat transfer systems to which conventional large steam turbines and electrical generators are coupled. Thus, a typical energy conversion process for a commercial nuclear reactor involves transfer of heat from the nuclear core to a primary coolant flow system, then to a secondary coolant flow system, and finally into steam from which electricity is generated.

In a liquid cooled nuclear reactor, such as a liquid metal cooled breeder reactor, a reactor coolant, such as liquid sodium, is circulated through the primary coolant flow system. A typical primary system comprises a nuclear core within a reactor vessel, a heat exchanger, a circulating pump and piping interconnecting the aforementioned apparatus. In nuclear reactors having more than one primary system, the nuclear core and the reactor vessel are common to each of the primary systems.

The heat generated by the nuclear core is removed by the reactor coolant which flows into the reactor vessel and through the nuclear core. The heated reactor coolant then exits from the reactor vessel and flows to the heat exchanger which transfers the heat to the secondary flow system associated therewith. The cooled reactor coolant exits from the heat exchanger and flows to a pump which again circulates the coolant into the pressure vessel, repeating the described flow cycle.

In the liquid metal nuclear reactor art, it is general practice to provide an inert gas blanket above free surfaces of the reactor coolant. This gas blanket, or cover gas, as it is more commonly referred to, prevents undesirable reactions of the liquid metal coolant with various reactor components. The cover gas above the level of reactor coolant within the reactor vessel prevents contact of intricate control rod drive mechanisms with the liquid metal reactor coolant. The circulating pumps of liquid metal cooled reactors also utilize a cover gas system. Here, the cover gas prevents contact of the pump motor and the pump seals with the liquid metal coolant. In nuclear reactors equipped with coolant reservoir tanks, a cover gas blanket is generally used above the level of coolant in this tank.

In accordance with the above, therefore, cover gas systems are generally beneficial; but they are not completely beneficial. For example, one disadvantage of the use of a cover gas system with a circulating pump involves the location of the pump within the primary system of the nuclear reactor. A so-called "cold leg" pump is one which is located between the outlet of the heat exchanger and the inlet of the reactor vessel. On the other hand, a "hot leg" pump is one which is located betweem the outlet of the reactor vessel and the inlet of the heat exchanger. Other than location, the primary difference between these two types of pumps is that the operating temperature environment of the hot leg pump is significantly higher than that of the cold leg pump. Obviously, from a design viewpoint, the cold leg pump is more desirable. However, the use of a cover gas, at least in the prior art, usually necessitated the use of a hot leg pump. This is because the vertical height of the pump cover gas space and therefore the length of the pump shaft must equal, as a minimum, the change in the level of reactor coolant within the pump from zero pump speed to operational speed if the same cover gas pressure is maintained over the pumps as over the reactor. For purposes of comparison, in one liquid metal system, the required cover gas height and therefore the length of the pump shaft was 12 feet for a hot leg pump and 36 feet for a cold leg pump. With this kind of dramatic difference, it is readily understandable why the prior art utilizes hot leg pumps, notwithstanding the associated disadvantages of the higher operational temperatures.

Nuclear reactors of the type described herein must and do consider reactor safety a foremost design requirement.

One area of reactor safety relates to the serious consequences of the "Loss of Coolant Accident" which could result from the rupture of one of the main coolant circulating lines, the most severe which is generally conceded to be a fully displaced "guillotine" rupture -- that is, a double ended rupture. Should the reactor core be deprived of coolant for an extended period of time, consequences as serious as a core meltdown could conceivably occur.

Liquid metal cooled reactors of the type considered herein have guard vessels surrounding the reactor vessel so that coolant cannot leak out by gravity. In addition, the pressure levels are so low that a rupture is extremely unlikely.

Upon the occurrence of a double ended rupture, which as noted above, is highly unlikely, the reactor will be scrammed and the coolant circulating pumps will be immediately shut down. However, during a period of time known as pump coast down, reactor coolant will be discharged by the pump out of both ends of the ruptured pipe. Depending upon the length of time of pump coast down, it is conceivable that a considerable amount of reactor coolant is discharged. The reactor vessel must therefore be designed to include a sufficient inventory of liquid metal above the core so that the amount of coolant discharged during the pump coastdown will not uncover the core.

The pressurized cover gas systems of the prior art tend to accentuate the discharge of reactor coolant from a double ended pipe rupture. A positive pressure at the inlet of the circulating pump will cause increased flow during pump coastdown. The cover gas pressure within the reactor vessel will cause more rapid discharge of the reactor coolant from the pressure vessel. Finally, the cover gas pressure within a reservoir tank will cause rapid depletion of reactor coolant which was stored for the purposes of providing emergency core cooling. Therefore, the cover gas systems of the prior art could have a detrimental effect should a double ended pipe rupture occur, however unlikely.

SUMMARY OF THE INVENTION

The aforementioned problems of the prior art are overcome by the present invention by providing a core cooling and cover gas system which: permits the use of a cold leg pump in combination with a balanced atmospheric pressure cover gas system; provides a reactor coolant reservoir for purposes of emergency core cooling; maintains a back pressure at the core outlet sufficient to overcome the pressure drop through the heat exchanger and piping and still provide adequate pressure to the pump so that pump cavitation does not occur; and, maintains the cover gas pressure at substantially atmospheric levels.

A flow restricting barrier is immersed in the liquid coolant in the reactor vessel above the main coolant outlet nozzles of a liquid metal cooled nuclear reactor. The reactor coolant flowing through the barrier is drained to a suitable location in the primary loop, such as into the reactor coolant reservoir tank. The pressure of the cover gas above the reactor coolant in the reactor vessel is then maintained at the same relatively low pressure as the cover gas above the primary coolant circulating pumps and the cover gas above the reactor coolant reservoir tank.

BRIEF DESCRIPTION OF THE DRAWINGS

Other advantages of the invention will be apparent from the following detailed description taken in consideration with the accompanying drawings, in which:

FIG. 4 is a detailed view illustrating a method of sealing between the flow restricting barrier and an elongated rod representing typical reactor apparatus passing therethrough;

FIG. 6 is another version of a seal as provided by FIG. 4.

DESCRIPTION OF THE PREFERRED EMBODIMENT

Throughout the description which follows, like characters indicate like elements of the various figures of the drawings.

Figure 1:
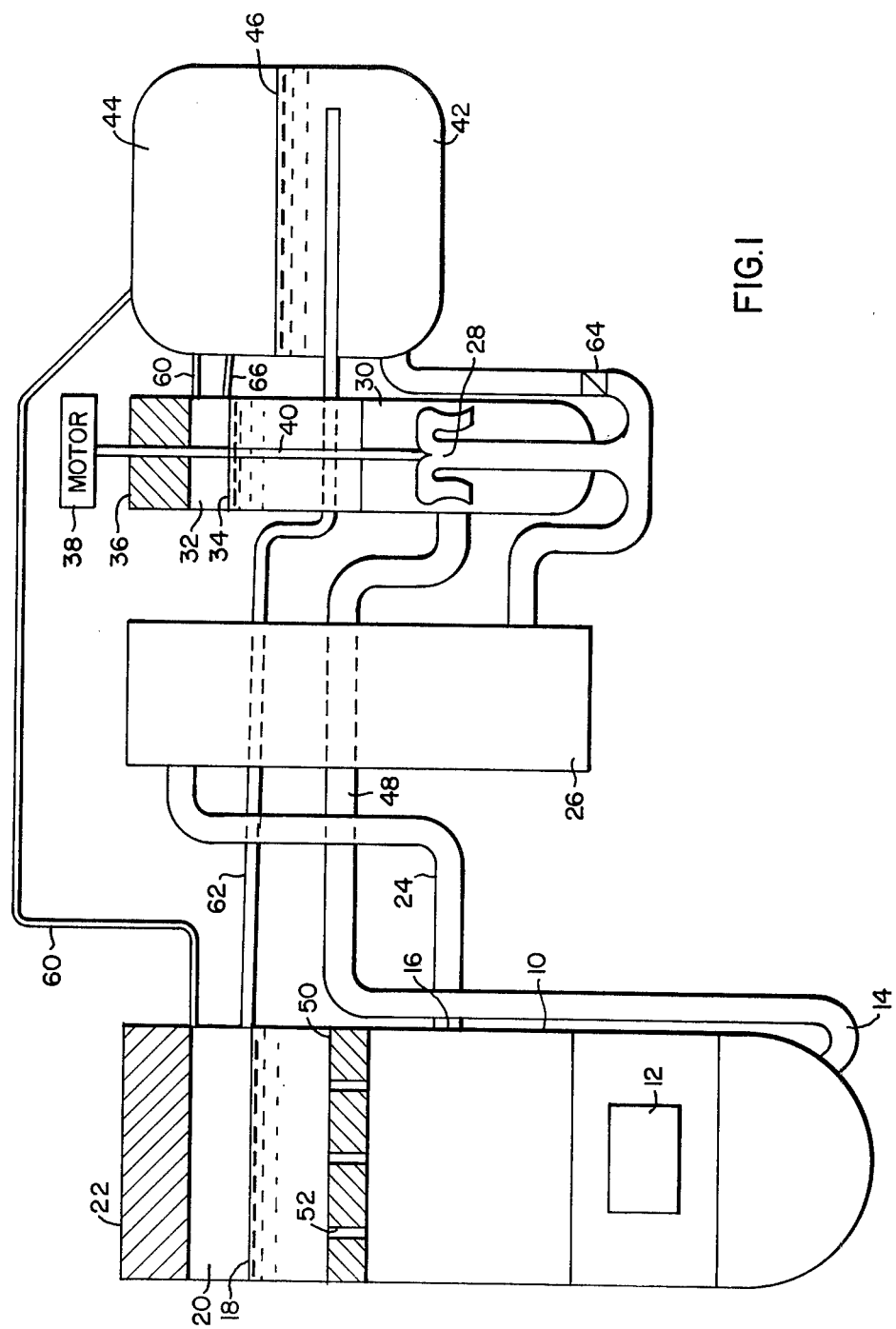
FIG. 1 is a schematic of a primary coolant flow system of a nuclear reactor having a piped suction pump and a separate reactor coolant reservoir.

Referring now more particularly to FIG. 1 of the drawings, a primary system coolant flow loop of a nuclear reactor incorporating the principles of this invention is schematically illustrated. A sealed reactor vessel 10 houses a nuclear core 12 which contains fissile material. Reactor vessel 10 includes primary coolant inlet and outlet nozzles, 14 and 16 respectively. Nozzles 14 and 16 provide for ingress and egress of reactor coolant through the reactor vessel 10 and the nuclear core 12 contained therein. During reactor operation, the reactor vessel 10 is filled with a quantity of reactor coolant to the level indicated in the schematic and designated numeral 18. In the type of reactor considered herein, the reactor coolant comprises liquid sodium.

A blanket of inert gas 20 occupies the space within the reactor vessel 10 above the level of reactor coolant 18. Typically, the cover gas may consist of helium, nitrogen, argon, or some other like inert gas which does not adversely react with the reactor coolant or interfere with various aspects of reactor operation such as detection of leaks in reactor apparatus. A shield plug 22 is utilized to seal the reactor vessel and provide radiation shielding from radiation emitted from the nuclear core.

Upon passing through the nuclear core 12 and exiting from the reactor vessel 10 through primary coolant outlet nozzle 16, hot reactor coolant flows through a portion of interconnecting piping 24 and into a heat exchanger 26. The hot reactor coolant transfers the heat it previously acquired from the nuclear core to a fluid of another system (not shown) in heat exchanger 26. Cooled reactor coolant exits from heat exchanger 26 and enters the inlet of a primary coolant circulating pump 28, which comprises, in the schematic, a piped suction pump.

As schematically shown in FIG. 1, circulating pump 28 is housed within an enclosure 30. In a manner similar to the reactor vessel 10, enclosure 30 is partially filled with reactor coolant and has a cover gas 32 above the level 34 of the reactor coolant therein. Enclosure 30 is appropriately capped and shielded by plug 36. Circulating pump 28 is driven by motor 38 which is located external of enclosure 30. A shaft 40 extends from the pump 28, through the reactor coolant 34, through the cover gas 32, through plug 36 to motor 38. Thus, shaft 40 is sealingly received by plug 36.

Pump 28 circulates the cooled reactor coolant back into reactor vessel 10 through inlet nozzle 14. The pump shown in FIG. 1 is classified as a cold leg type of pump in that it pumps cooled rather than hot reactor coolant.

A reactor coolant reservoir tank 42 is included within the illustrated primary system. Reservoir tank 42 is not serially connected to the primary flow system; hence, reactor coolant which is contained within reservoir tank 42 only incidentally flows through the primary system, as will be more fully explained hereinafter. An inert cover gas 44 is utilized above the level 46 of reactor coolant within reservoir tank 42. The level of reactor coolant in reservoir tank 42 is below the level of coolant 18 in reactor vessel 10.

Although FIG. 1 only shows one primary coolant flow system of a nuclear reactor, it will be appreciated by one skilled in the art that the invention is not to be thereby limited. The invention may be equally applied to a reactor having any number of primary coolant flow systems in which the reactor vessel 10 is common to all, and in which one or more coolant reservoir tanks may be used.

A flow restricting barrier 50 is immersed in the reactor coolant within the reactor vessel 10 above outlet nozzle 16. Flow barier 50 is closely received by a reactor vessel 10 so as to permit no or a controlled amount of leakage of reactor coolant therepast. In this regard, flow barrier 50 may contain a plurality of holes of a predetermined size to permit a predetermined quantity of reactor coolant to flow through flow barrier 50. It will therefore be apparent that flow barrier 50 results in the pressure of the reactor coolant above the flow barrier being lower than that of the reactor coolant below the flow barrier. Therefore, the pressure of the cover gas 20 can be maintained at a pressure lower than that of the reactor coolant at the location of the outlet nozzle 16. This relatively low cover gas pressure is an important factor in the highly unlikely event of a double ended pipe break of coolant line 24 or coolant line 48. Assuming that the break occurs in line 48, the reactor coolant within reactor vessel 10 will be discharged therefrom by the pressure of the cover gas 20, and not by the higher reactor coolant pressure. This is because the pressure of the reactor coolant, being substantially incompressible, will be immediately reduced to that of the cover gas pressure upon the initiation of the pipe break. Since the rate of discharge is a function of the pressure of the reactor coolant, the relatively low cover gas pressure causes a relatively small amount of reactor coolant to be discharged from the reactor vessel 10. Therefore, the core 12 will not be bared of reactor coolant and an effective emergency core cooling arrangement results. Of course, the amount of leakage through flow barrier 50, and therefore the pressure of the cover gas 20, is to be determined for a particular nuclear reactor so as to provide this emergency core cooling.

Still referring to FIG. 1, it is to be noted that the cover gas 20 of the reactor vessel 10 is connected to the cover gas 44 of the coolant reservoir tank 42 which in turn is connected to the cover gas 32 of circulating pump enclosure 30. This interconnection may be accomplished by conventional methods. One such method is by use of a suitably sized equalizer pipe 60. Pipe 60 may include a pressure regulator (not shown) for the purpose of controlling all the cover gas pressures equally by a single source.

Since the pressure of cover gas 32 within the circulating pump enclosure 30 is also relatively low, the invention permits the use of a cold leg pump in conjunction with a pump cover gas. It will be remembered that a cold leg pump operates at a temperature of the cooled reactor coolant; hence, it experiences a less hostile environment than that of a hot leg pump which operates at the temperature of the hot reactor coolant. And, because the coolant level does not vary appreciably, the inventive system does not necessitate as long a pump shaft 40 as was required in the prior art. The invention therefore allows the use of a cold leg pump with a shorter pump shaft than that previously required for hot leg pumps.

The reactor coolant which leaks, at a controlled rate, from the region below the flow barrier 50 into the region above flow barrier 50, is discharged from the reactor vessel 10 through low pressure drop piping 62 into the reactor coolant reservoir tank 42. From tank 42 the leakage of reactor coolant flows into the inlet of the circulating pump 28. It is to be noted that piping 62 comprises low pressure drop piping. This is preferred so that the cover gas 20 within the reactor vessel 10 may be maintained at a minimum pressure for the reasons mentioned above. Since the reactor coolant is dicharged from the reactor vessel, the temperature of the leakage reactor coolant is relatively high in that it is substantially equal to the temperature of the reactor coolant exiting from the core 12. Also, the temperature of the reactor coolant at the circulating pump 28 inlet is relatively cool as a result of having transferred its heat within the heat exchanger 26. Thus, it may be desirable to provide an auxiliary heat exchanger (not shown) within line 62 or provide for adequate mixing of the reactor coolant within the coolant reservoir tank 42. It may also be desirable to provide a check valve 64 in a line leading from the coolant reservoir tank 42 to the pump 28 inlet to guard against backflow of coolant from the pump into the reservoir tank.

Figure 5:
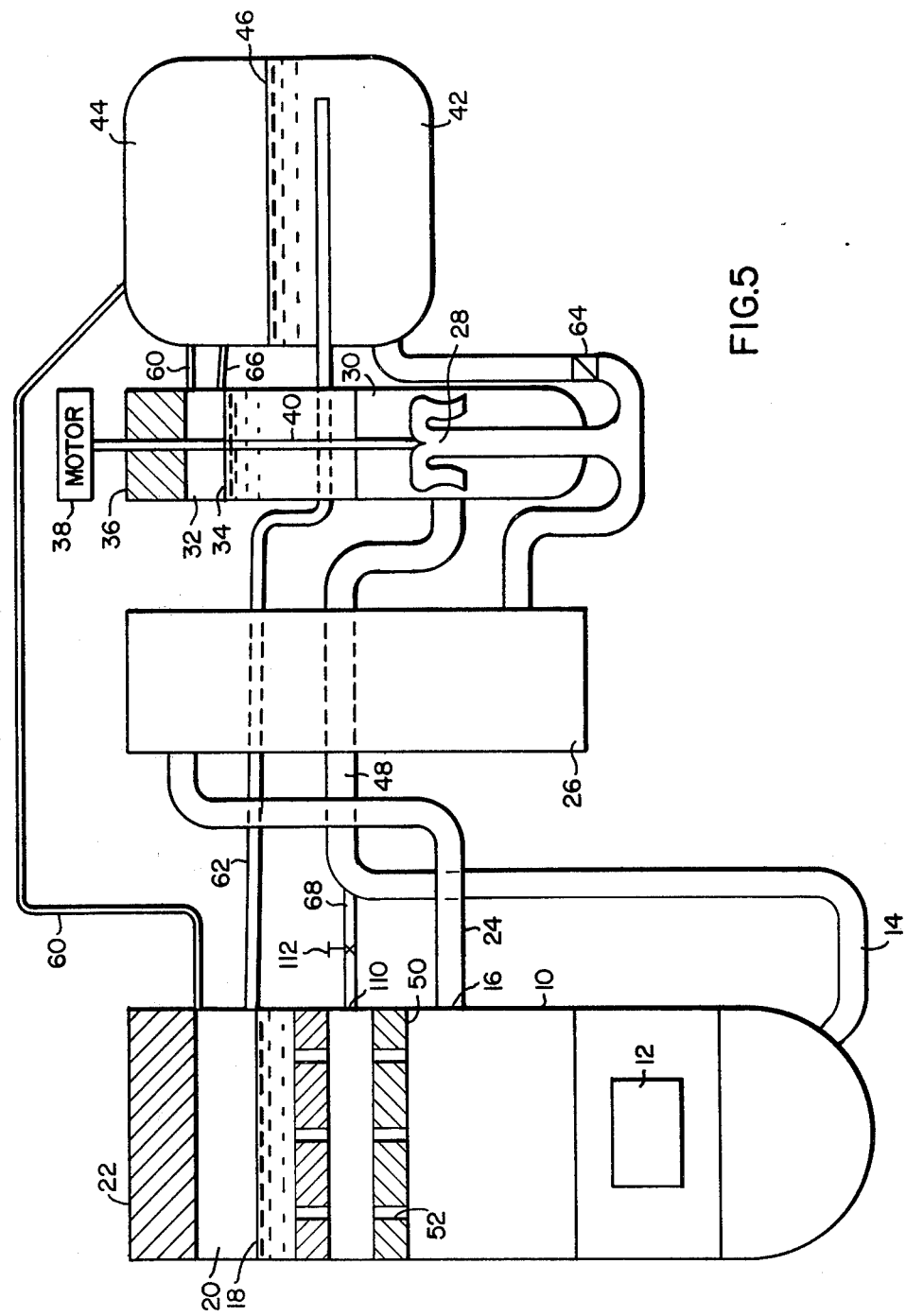
FIG. 5 is another version of the primary system of FIG. 1.

FIG. 5 illustrates an alternate arrangement, in lieu of an auxiliary heat exchanger, to compensate for hot leakage of reactor coolant from the reactor vessel 10 mixing with the cold coolant in the reservoir tank 42. An additional flow barrier 52 is utilized above barrier 50 in reactor vessel 10. A line 68 is provided between the pump outlet 48 and an additional inlet 110 to the reactor vessel 10. A valve 112 is also included within line 68. In operation, line 68 and flow barriers 50 and 52 allow relatively cold reactor coolant to be pumped within the space between barriers 50 and 52 at a pressure slightly higher or equal to the coolant pressure at reactor outlet nozzle 16. This cool reactor coolant flows up through barrier 52 and down through barrier 50. Thus, relatively cool reactor coolant leakage is circulated from the reactor vessel 10 and into the reservoir tank 42, and no mixing is required.

Another low pressure drop pipe 66 is provided between the circulating pump enclosure 30 and the reactor coolant reservoir tank 42. Pipe 66 allows for leakage of reactor coolant from within enclosure 30 to tank 42 so as to maintain the level of reactor coolant 34 in enclosure 30.

The reactor coolant and cover gas system shown in FIG. 1 of the drawings accomplishes a number of purposes. For example: it interconnects and maintains all the cover gases at the same pressure, and yet provides the reactor coolant pressure at reactor vessel discharge at a sufficiently higher level than the reactor coolant pressure at the pump inlet thereby forcing the reactor coolant through the primary flow system piping and the heat exchanger within the system; it also provides sufficient reactor coolant inventory to guard against melting of a nuclear core in the highly unlikely event of a double ended pipe rupture; the interconnected cover gas system with relatively simple overflows from the reactor vessel and circulating pump enclosures to the reservoir tank achieves a constant reactor coolant level in the reactor vessel and pump enclosures, and eliminates the draw down and change of reactor vessel and pump enclosure reactor coolant levels, thereby eliminating or minimizing the possibility of thermal stresses within the primary coolant flow system.

Figure 2:
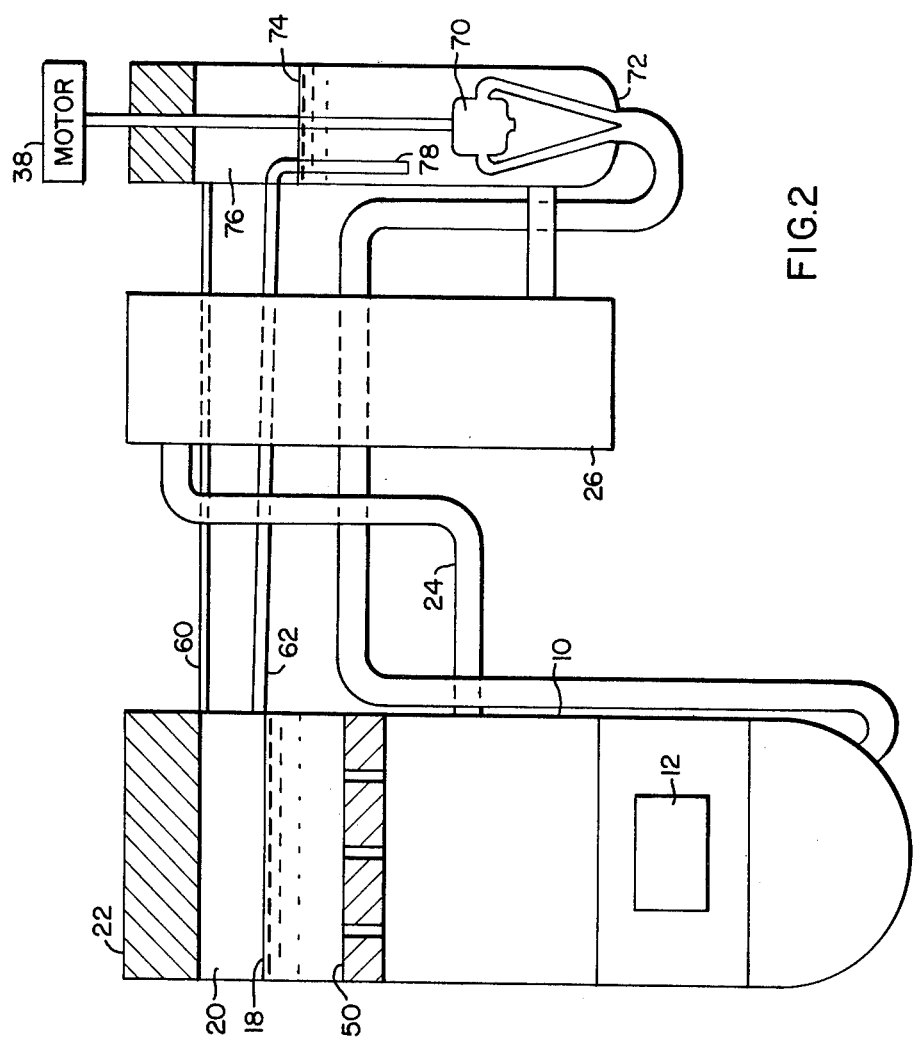
FIG. 2 is a schematic of another primary coolant flow system of a nuclear reactor having a sump suction circulation pump with the sump tank forming a reactor coolant storage reservoir.

Another embodiment of the invention is schematically shown in FIG. 2 of the drawings. Referring now to this figure, it will be seen that the primary coolant flow system depicted therein is similar to that shown in FIG. 1 with the following exceptions: the primary coolant circulating pump 70 comprises a sump suction type of pump rather than a pipe suction pump; the reactor coolant reservoir tank 42 has been eliminated by utilization of the pump tank 72 for this purpose.

In this embodiment, the level of reactor coolant 74 in the pump tank 72 must be maintained at a level slightly below that of the reactor coolant 18 in the reactor vessel 10. This is necessary so that the reactor coolant leaking past flow barrier 50 may be discharged from the reactor vessel 10 with a minimum of pressure drop into pump tank 72. The cover gas space 76 within pump tank 72 is maintained at the same pressure as that of cover gas 20 within the reactor vessel 10 by equalizer pipe 60.

Again, it may be desirable to cool the reactor coolant being discharged from the reactor vessel 10 into pump tank 72 by an arrangement similar to that shown in FIG. 5 or by a suitable auxiliary heat exchanger (not shown) connected to pipe 62. It may also be desirable to use a flow barrier (not shown) within pump tank 72 to minimize communications between the cover gas 76 and the pump inlet 78.

Figure 3:
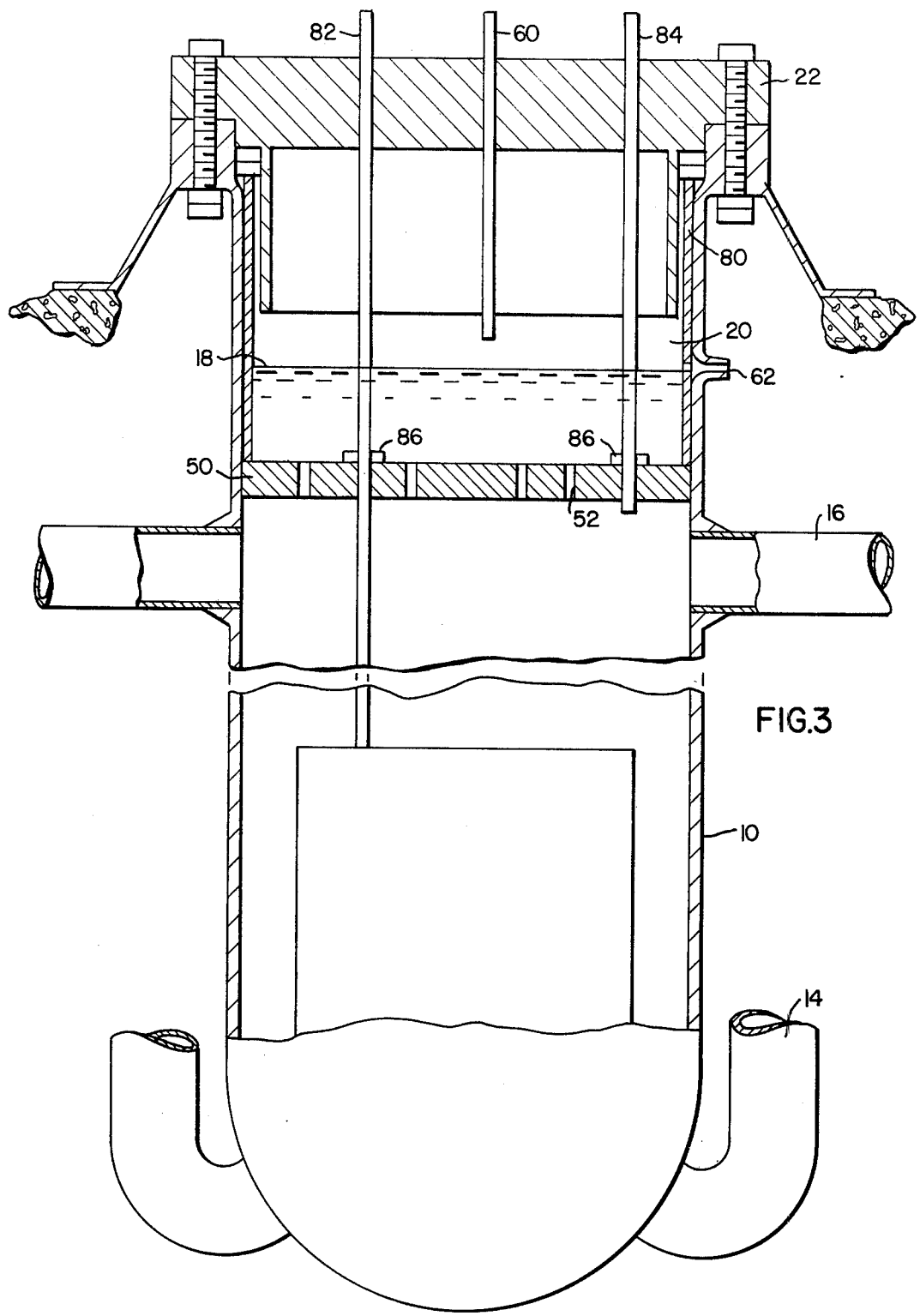
FIG. 3 is a detailed assembly of a reactor vessel of a liquid metal cooled nuclear reactor having a flow restricting barrier incorporated therein.

A number of exemplary design details of flow restricting barrier 50 as adapted to reactor vessel 10 is shown in FIG. 3 of the drawings. Flow restricting barrier 50 resembles an inverted hat having its brim or upper flange 80 secured by the sealed flanges of plug 22 and reactor vessel 10. In this manner, the region of the reactor vessel above the flow barrier 50 is substantially sealed from the region below flow barrier 50. Holes 52 having a predetermined size are provided within flow barrier 50 to control the leakage of reactor coolant from below flow barrier 50 into the region above flow barrier 50. Hence, this reactor coolant leakage flow past flow barrier 50 may be precisely controlled.

In a reactor installation it will be necessary for certain reactor apparatus to pass through the head or seal plug 22 of the reactor vessel and extend within the core therein. Such reactor apparatus might include a drive shaft 82 of a control rod or a thermocouple column 84. Since the same reactor apparatus must also pass through flow barrier 50, it is desirable to provide a seal 86 between these reactor apparatus and flow barrier 50. One version of such a seal 86 is shown in FIG. 4.

A hole 94 within flow restricting barrier 50 is relatively larger than reactor apparatus 82 or 84, so as to allow for ease of reactor assembly. A seal disc 90 having a piloting hole 96 therethrough is positioned around reactor apparatus 82 or 84 and rests on the upper surface 98 of flow restricting barrier 50. Hole 96 is only slightly larger than the diameter of reactor apparatus 82 or 84 so as to minimize or substantially eliminate leakage of reactor coolant therepast. A securing member 88 is also positioned around reactor apparatus 82 or 84 and rests on the top surface of seal disc 90. It is to be noted that the height of the recess formed by member 88 and the upper surface 98 of the flow barrier 50 is greater than the thickness of seal disc 90. This assures that, along with the pilot of hole 96, the seal disc 90 will properly be aligned with reactor apparatus 82 or 84. The complete seal assembly 86 is finalized by welding 92 securing member 88 to the upper surface 98 of flow barrier 50. It is to be noted that the seal shown in FIG. 4 is only one of many possible designs that can be utilized. Indeed, one skilled in the art can readily envision a number of such seal designs that would be completely adequate.

In FIG. 6, the seal arrangement 86 is shown with regard to the double flow barrier arrangement of FIG. 5.

From the foregoing description, taken in connection with the drawings, it is seen that this invention provides a balanced cover gas system and a reactor core cooling system which provides for emergency core cooling in the event of a double ended pipe break.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

We claim:

1. In a primary coolant flow system of a liquid cooled nuclear reactor including a reactor vessel, a heat exchanger flow connected to a first outlet of said reactor vessel, and a coolant circulating pump flow connected to an inlet of said reactor vessel, said reactor vessel having a core positioned therein, being partially filled with reactor coolant and having a cover gas above the level of reactor coolant therein, the system comprising coolant flow restricting means immersed within the reactor coolant in the reactor vessel for maintaining a predetermined rate of flow of reactor coolant from below the restricting means to above the restricting means, said restricting means being positioned above said first outlet of the reactor vessel, and a second outlet of said reactor vessel above said restricting means; said second outlet being flow connected to an inlet of said circulating pump.

2. The system of claim 1 including a storage tank partially filled with reactor coolant and having a cover gas above the reactor coolant stored therein, an outlet of said storage tank being connected to an inlet of said circulating pump and an inlet of said storage tank being connected to said outlet of said reactor vessel so as to maintain a predetermined level of reactor coolant in said reactor vessel and in said storage tank.

3. The system of claim 2 wherein the level of reactor coolant in said storage tank is below the level of reactor coolant in said reactor vessel.

4. The system of claim 2 including equalizer means connecting said storage tank with said reactor vessel for equalizing the pressure of said cover gas in said reactor vessel with the pressure of said cover gas in said storage tank.

5. The system of claim 2 including a check valve between said outlet of the storage tank and said inlet of the circulating pump to prevent back flow of reactor coolant from the circulating pump into the storage tank.

6. The system of claim 1 including an enclosure within which said circulating pump is located, said enclosure being partially filled with reactor coolant and having a cover gas above the level of reactor coolant therein, an outlet of said enclosure being connected to an inlet of said pump, and said outlet of the reactor vessel being connected to an inlet of said enclosure so as to maintain a predetermined level of reactor coolant in said reactor vessel and in said pump enclosure.

7. The system of claim 6 wherein said level of reactor coolant within said pump enclosure is lower than the level of reactor coolant within said reactor vessel.

8. The system of claim 6 including equalizer means connecting said pump enclosure with said reactor vessel for equalizing the pressure of said cover gas in the reactor vessel with the pressure of said cover gas in the pump enclosure.

9. The system of claim 8 wherein said equalizer means comprises a pipe connecting said pump enclosure with said reactor vessel.

10. The system of claim 6 wherein said circulating pump is of a type classified as a piped suction pump.

11. The system of claim 1, including an enclosure comprising a sump tank and wherein said circulating pump is of a type classified as a sump suction pump, said pump beinig located within said sump tank.

12. The system of claim 11, wherein said enclosure is a storage tank for storage of reactor coolant, said enclosure being partially filled with said reactor coolant and having a cover gas above the level of said reactor coolant.

13. The system of claim 12, wherein said level of reactor coolant in said sump tank is lower than said level of reactor coolant within said reactor vessel.

14. The system of claim 11 including equalizer means connecting said reactor vessel with said sump tank for equalizing the pressure of said cover gas within said reactor vessel with the pressure of said cover gas within said sump tank.

15. The system of claim 14 wherein said equalizer means comprises a pipe connecting said reactor vessel with said sump tank.

16. The system of claim 1, wherein said flow restricting means comprises a plate member fixedly disposed within said reactor vessel having its axis of rotation substantially transverse to the longitudinal axis of said reactor vessel, said plate member including a plurality of holes passing therethrough, said holes being of a predetermined size.

17. The system of claim 16, wherein said plate member is supported within said reactor vessel at its periphery by a flange on said reactor vessel and a seal plug on said reactor vessel so as to seal between the periphery of said plate member and said reactor vessel.

18. The system of claim 1, wherein said flow restricting means comprises a pair of spaced plate members fixedly disposed within said reactor vessel having their axis of rotation substantially transverse to the longitudinal axis of said reactor vessel, said plate members each having a plurality of holes of a predetermined size passing therethrough.

19. The system of claim 18 including a storage tank partially filled with reactor coolant and having a cover gas above the reactor coolant stored therein, an outlet of said storage tank connected to an inlet of said circulating pump, an inlet of said storage tank being connected to an outlet of said reactor vessel, and an outlet of said circulating pump being connected to an inlet of said reactor vessel which is located betweem said spaced plate members.

* * * * *